United States Patent
Chacko

(12) 
(10) Patent No.: US 6,372,358 B1
(45) Date of Patent: Apr. 16, 2002

(54) COVERCOAT COMPOSITION FOR ELECTRONIC COMPONENTS

(75) Inventor: Antony P. Chacko, Granger, IN (US)

(73) Assignee: CTS Corporation, Elkhart, IN (US)

( * ) Notice: Subject to any disclaimer, the term of this patent is extended or adjusted under 35 U.S.C. 154(b) by 83 days.

(21) Appl. No.: 09/644,889

(22) Filed: Aug. 23, 2000

(51) Int. Cl.$^7$ ............ B32B 27/34; C08K 5/16; C08L 27/18; C08L 77/04
(52) U.S. Cl. ............ 428/473.5; 428/422; 524/104; 524/209; 524/514; 524/546
(58) Field of Search ............ 428/473.5, 522, 428/327, 331, 422; 524/104, 209, 492, 493, 546, 514

(56) References Cited

U.S. PATENT DOCUMENTS 5,880,205 A * 3/1999 Tannenbaum ............... 524/520
5,972,494 A * 10/1999 Janssens ............... 428/324

* cited by examiner

Primary Examiner—D. S. Nakarani
(74) Attorney, Agent, or Firm—Mark P. Bourgeois; Mark W. Borgman

(57) ABSTRACT

A covercoat composition for electronic components that has improved performance to environmental and processing exposure. The covercoat composition has 15–30 wt. % of polyamide-imide, a polytetrafluoroethylene present in an amount up to 20 wt. % and a silica present in an amount up to 15 wt. %, wherein all of the covercoat components are dispersed in a 60–80 wt. % organic solvent. A more preferred range of polyamide-imide is 20–25 wt. % of the total composition. A preferred organic solvent is N-methyl Pyrrolidone.

12 Claims, No Drawings

COVERCOAT COMPOSITION FOR ELECTRONIC COMPONENTS

BACKGROUND OF THE INVENTION

1. Field of the Invention

This invention relates to electronic components such as position sensors that have screen printed silver conductors, and particularly to an improved covercoat composition that minimizes silver migration of the screen printed silver conductive and provide flexibility to withstand the production assembly process and to ensure reliable performance of the sensor. The covercoat composition is applicable to electronic components and assemblies in general.

2. Description of the Related Art

Typical position sensors have voltage indicating variable resistor elements. These resistor elements are prepared from polymer thick film materials. The resistive element is in most cases printed over a conductive element which acts as the collector element. Several substrates can be used such as Polyimide, FRP, ceramic, and other flexible polymer films. The elements, contactors and other components of the sensors are assembled in a plastic housing assembly. In position sensing applications, a metallic wiper slides over a resistive element. The wiper slides several million cycles over the collector and resistive elements during the lifetime of the electronic component. For accurate position sensing, the wiper should give continuous electrical output throughout the life of the sensor. The durability of these position-sensing elements depends on the physico-chemical properties of both resistor and conductive film. The conductive film is usually prepared from a polymer composition containing metallic particles to produce sufficient conductivity. Silver is preferred for conductive composition because of its high electrical conductivity. However, the use of silver presents a serious drawback due to a phenomenon known as silver migration—i.e., the tendency of the silver particles, in a high humidity atmosphere, to migrate from the anode to the cathode, ultimately forming a high impedance short between the separate conductors. In order to inhibit silver migration, the silver conductive film is often cover-coated with a layer of dielectric material in the regions most susceptible to silver migration.

The penetration of moisture into hermetically sealed electronic packages or the permeation of moisture through plastic in non-hermetically sealed packages, especially in the presence of small amounts of ionic impurities are known to cause device or circuit failures. These ionic impurities cause electrochemical phenomena such as metal migration that catastrophically bridge and short out closely spaced conductors. Silver migration between two slightly biased terminals occurs in a matter of minutes if moisture or water and some ionic residues are present. Silver dissolves as cations at the anode, the ions are attracted to the cathode whereupon they are reduced by capturing an electron and then migrate (deposit and grow) as metallic silver, ultimately bridging the gap and shorting the circuit.

A covercoat, among its other functions, provides protection from high humidity environments to the underlying electronic circuit. To fulfill this function the covercoat should have sufficient durability to survive the environments encountered in the production and the environment typically seen in application. The covercoat material should have low permeability to moisture and other ionic impurities. A polymer system with otherwise low permeability can exhibit significantly higher permeability at temperatures higher than the glass transition temperature. This necessitates that these covercoat systems should have a glass transition temperature higher than the temperature seen during its application. A covercoat system which exhibits a hydrophobic property and low surface energy are preferred for robust moisture resistance.

Flexible position sensing elements such as polymer thick films on Polyimide substrates undergo numerous back bending, forward bending, creasing, twisting, and other mechanically harsh process steps during assembly. A dielectric covercoat of brittle nature can crack during these operations. These normal assembly operations can result in a break in the bond between the silver conductor and the protective over-coating, such that, in the region of the break, the exposed silver is subject to silver migration. The Temperature Coefficient of Expansion (TCE) of the covercoat which, unless it is carefully matched to the adjacent resistive and conductive film, can set up substantial mechanical stresses which can lead to cracks and adhesion failures exposing the silver for silver migration. A covercoat system should have improved flexibility and TCE similar to the conductive and resistive films.

Another important property desired of these materials is a strong adhesion to the substrate as well as to the resistive and conductive materials. In automotive applications, lubricants used in other components may come into the sensor and can diffuse into the interface between the covercoat and the conductive film. This diffusion of the lubricant fluids can lead to a loss in adhesion of the covercoat film to the conductive film. A loss in adhesion can expose silver for silver migration. A strongly bonded covercoat material to the conductive can prevent this diffusion of the lubricant into the interface.

Good processing flexibility is desired for application of a covercoat composition onto a variety of substrate materials. A low curing temperature is required for phenolic and epoxy reinforced FRP materials, where as ceramic and Polyimide substrates can be cured at higher temperatures. Polymers, which give good performance when, cured at 200–300 degrees Celsius are preferred for application in position sensors. In addition to cure temperatures, a low cure time is desired due to both substrate limitations and processing costs.

Another desirable property for the covercoat composition is to have a long shelf life. A change in viscosity during storage can affect the processability and result in poor printing qualities.

SUMMARY OF THE INVENTION

A feature of the invention is to provide a covercoat composition for electronic components that gives improved environmental resistance.

A feature of the invention is to provide a covercoat composition that includes 15–30 wt. % of polyamide-imide, a polytetrafluoroethylene present in an amount up to 20 wt. % and a silica present in an amount up to 15 wt. %, wherein all of the covercoat components are dispersed in a 60–80 wt. % organic solvent. A more preferred range of polyamide-imide is 20–25 wt. % of the total composition. A preferred organic solvent is N-methyl Pyrrolidone.

The invention resides not in any one of these features per se, but rather in the particular combination of all of them herein disclosed and claimed. Those skilled in the art will appreciate that the conception, upon which this disclosure is based, may readily be utilized as a basis for the designing of other compositions, methods and systems for carrying out the several purposes of the present invention. Further, the abstract is neither intended to define the invention of the application, which is measured by the claims, neither is it intended to be limiting as to the scope of the invention in any way.

DETAILED DESCRIPTION OF THE PREFFERED EMBODIMENT(S)

1. Polymer Components

The polymer solution is a high Tg polyamide-imide polymer in N-methyl pyrrolidone solvent. Polyamide-imide polymers are commercially available from BP Amoco under the trade Names-Al-10, Torlon etc. In the covercoat composition of the present invention, the polymer component is used in the range of 15–30 wt. % of the covercoat composition, with a more preferred range of 20–25 wt. %. If less than 15 wt. % resin is used, the resulting covercoat composition has poor screen printing properties as well as weak mechanical properties and poor adhesion. If more than 30 wt. % is used, the resulting composition has less hydrophobic properties.

All weight percent compositions specified are based upon the total weight percent of the composition unless otherwise indicated.

2. Hydrophobic Additives

Two hydrophobic additives used in this formulation are PTFE (polytetrafluoroethylene) and hydrophobic silica. Both these additives contribute to the hydrophobic property of the coating. Silica particles in addition to hydrophobicity also contribute to the mechanical property of the coatings. PTFE particles can be obtained from Dupont Corporation under the trade name Teflon. Silica particles can be obtained from Cabbot Corporation. The preferred particle size is less than 50 microns. Molecular silica with sub-micron particle sizes can also be used in the formulation. Molecular silica named POSS-5703 was used and can be obtained from Hybrid Plastics Corporation. PTFE is used in the range of 0–20 wt. % of the covercoat composition, with a more preferred range of 6–15 wt. %. Silica is used in the range of 0–15 wt. % of the covercoat composition, with a more preferred range of 0–2 wt. %.

3. Organic Vehicle

The solvent used in the covercoat composition is N-methyl pyrrolidone. The N-methyl pyrrolidone content ranges from 60–80 wt. %, with a more preferred range of 64–70 wt. %. The selection of the solvent is based on the good solubility of the polymer in this solvent. This solvent also has a high boiling point. Low evaporation of the solvent is preferred for continuous printing operation where no change in viscosity of the composition due to loss of solvent is desired. The polymer is dissolved completely prior to blending with silver particles. The preferred N-methyl pyrrolidone is commercially available from BASF Corporation.

4. Other Additives

Surfactants such as fluorinated oligomers are sometimes added to the composition for wettability and leveling properties. The fluorinated oligomers (FC 430, FC171, FC431) are commercially available from 3M Corporation. A preferred range of surfactant is from 0.1–0.5 wt. % of the total composition weight. Rheological additives such as Thixatrol plus, Bentone52, etc. are sometimes added to tailor rheological properties for different processing applications. Typical levels of use for effective flow control range from 0.1% to 2.0% of the total system weight. These rheological additives are available from Rheox Inc. Pigments can be added to the composition to provide color if desired. Pigments such as Irgalite Blue GLG can be obtained from CIBA. Pigments are 0–0.1 wt. % of the composition.

5. General Composition Preparation and Printing Procedures

In the preparation of the composition of the present invention, the filler particles are mixed with the polymer solution prepared as described above. The polymer-filler system is then fed to a three-roll mill to form a paste with fine particle size. The paste was milled for 10–30 minutes. Another method of mixing is Ball milling. The particle size range and viscosity of the paste is monitored to get a covercoat paste suitable for application in position sensors. The milling time and milling quantity on the three roll mill or on the ball mill determines the final particles distribution and size and resulting rheology.

The covercoat paste thus prepared is applied to a variety of substrates by conventional screen printing processes. A preferred substrate is Polyimide or polyimide. The wet film thickness typically used for position sensor applications is 40 microns. The wet film thickness is determined by the screen mesh and screen emulsion thickness. A preferred screen mesh of 325 is used for obtaining smooth covercoat film on a Polyimide substrate for position sensors. The wet film is then cured in a convection oven at a temperature range of 200–300 degrees Celsius for 15–30 minutes. Preferred curing conditions for covercoat film on a phenolic substrate is 220 degrees Celsius for 15 minutes. Preferred curing conditions for a covercoat film on a Polyimide and alumina substrate is 300 degrees Celsius for 10 minutes.

Test Procedures

Salt Solution Immersion

This test consists of exposing a conductor on a Polyimide substrate that has the covercoat composition applied for 50 or more hours in a 5% salt solution. The substrates are immersed in a partially ionized solution and connected in parallel to a constant voltage of 10V. The overall resistance of the conductor is checked prior to testing, immediately after immersion, and after completion of the test. The purpose of this test is to ensure that limited exposure to corrosive vapors shall not degrade the electronic component's performance. Pass criteria is no resistance change.

Humidity Exposure

This test consists of exposing the covercoated conductor on the substrate at 85 C and 85% relative humidity for 250 hours. Resistance of the conductor is characterized prior to and after exposure. The substrates are then exposed to ionized fluid for 50 hours. Pass criteria is no resistance change.

Mandrel Backbend

This test consists of backbending the substrate to the point where the covercoat peels off the Polyimide and therefore creates a bridge between the conductive traces and the direct environment. The purpose of this test is to ensure that the covercoat will not crack during assembly. Pass criteria is no resistance change on the conductor after 0.1 inches of backbend.

Acetone Double Rub Test

This test consists of rubbing the covercoat surface back and forth several times with acetone and comparing the surface finish prior to and following the test. Pass criteria is no resistance change on the conductor and no removal of the covercoat.

Crosshatch Adhesion

This test consists of using a single edge razor blade and scribing a series of approximately parallel lines and generating a minimum of 10 cross hatch patterns (#) per element. Then using a scotch magic tape, the element is sealed. The tape is then ripped off the element. Examination of the cross hatched area of the coating film determines the covercoat adhesion capabilities. Pass criteria is no removal of the covercoat by the scotch tape. This test is performed before and after humidity exposure, before and after salt immersion tests, before and after back bend tests.

The test results for 2 examples and 2 commercially available covercoat compositions are shown in Table 1. In table 1, the commercially available covercoat compositions are P-6280 from Emca-Remex Corporation and M7500 from Minico Corporation.

EXAMPLES

Example 1

This example describes the preparation of a covercoat composition. The components below were added to a 50-ml jar with mixing. The mixture was then ball milled for 2–8 hours. The covercoat is then screen printed on a Polyimide substrate, dried and cured. The adhesion, back bend test, salt immersion resistance, thermal shock, humidity resistance etc. are measured. Test results are shown in table 1.

| Component | Weight (%) |
|---|---|
| Polyamide imide | 23 |
| PTFE | 6 |
| Silica | 0.5 |
| Irgalite Blue GLG | 0.01 |
| N-methyl pyrrolidone | 70 |

Example 2

This example describes the preparation of a covercoat composition. The components below were added to a 50-ml jar with mixing. The mixture was then ball milled for 2–8 hours. The covercoat is then screen printed on a Polyimide substrate, dried and cured. The adhesion, back bend test, salt immersion resistance, thermal shock, humidity resistance etc. are measured. Test results are shown in table 1.

| Component | Weight (%) |
|---|---|
| Polyamide imide | 20 |
| PTFE | 15 |
| Silica | 2 |
| N-methyl pyrrolidone | 64 |

Example 3

This example describes the preparation of a covercoat composition. The components below were added to a 50-ml jar with mixing. The mixture was then ball milled for 2–8 hours. The covercoat is then screen printed on a Polyimide substrate, dried and cured.

| Component | Weight (%) |
|---|---|
| Polyamide imide | 20 |
| PTFE | 15 |
| POSS-5703 | 2 |
| N-methyl pyrrolidone | 64 |
| FC 430 | 0.2 |
| Bentone 52 | 0.5 |

TABLE 1

| Property | Example 1 | Example 2 | P-6280 (Emca-Remex) | M7500-G (Minico) |
|---|---|---|---|---|
| Back Bend (% pass 0.1" bend) | 100 | 100 | 0 | 0 |
| Humidity (% pass) | 100 | 100 | | |
| Cross Hatch adhesion before and after humidity and back bend (% pass) | 100 | 100 | 30 | 20 |
| Salt immersion test (% pass) | 100 | 100 | 100 | 100 |
| Acetone rub (% pass) | 100 | 100 | 0 | 0 |
| Adhesion after salt immersion (% pass) | 100 | 100 | 0 | 0 |
| Thermal shock (% pass) | 100 | 100 | 100 | 100 |
| Salt immersion after fluid immersion (% pass) | 100 | 100 | 0 | 0 |

What is claimed is:

1. A protective covercoat composition, for application to a polyimide substrate for preventing silver migration, the composition based on total composition, comprising:
    a) 15–30 wt. % of polyamide-imide;
    b) a polytetrafluoroethylene present in an amount up to 20 wt. %; and
    c) a silica present in an amount up to 15 wt. %, wherein all of (a), (b) and (c) are dispersed in a 60–80 wt. % organic solvent.

2. The covercoat composition according to claim 1, wherein the polyamide-imide is 20–25 wt. % of the total composition.

3. The covercoat composition according to claim 1, wherein the organic solvent is N-methyl Pyrrolidone.

4. The covercoat composition according to claim 1, further comprising a flourochemical surfactant present in an amount up to 0.5 wt. % to improve wettability.

5. The covercoat composition according to claim 1, further comprising a rheological additive present in an amount up to 2 wt. % to modify the viscosity of the covercoat composition.

6. The covercoat composition according to claim 1, wherein the covercoat composition exhibits a curing temperature range from 200 degrees Celsius to 300 degrees Celsius.

7. The covercoat composition according to claim 1, wherein the covercoat composition exhibits a curing time between 10 to 30 minutes.

8. A protective covercoat composition for preventing silver migration in electronic components, the covercoat composition based on total composition, comprising:
    a) 15–30 wt. % of polyamide-imide;
    b) 6–15 wt. % polytetrafluoroethylene;
    c) 0.5–15 wt. % silica;
    d) 60–80 wt. % n-methyl pyrrolidone, wherein all of (a), (b), and (c) are dispersed in the n-methyl pyrrolidone;
    e) 0.1–0.5 wt. % fluorochemical surfactant to improve wettability of the covercoat composition; and
    f) 0.1–2 wt. % rheological additive to modify viscosity of the covercoat composition.

9. The covercoat composition according to claim 8, wherein the polyamide-imide is 20–25 wt. % of the total composition.

10. The covercoat composition according to claim 8, wherein the covercoat composition exhibits a curing temperature range from 200 degrees Celsius to 300 degrees Celsius.

11. The covercoat composition according to claim 8, wherein the covercoat composition exhibits a curing time between 10 to 30 minutes.

12. An electronic component having a cured covercoat composition for preventing silver migration in the electronic component, comprising:
   a) a polyimide substrate having a surface;
   b) a conductor located on the surface;
   c) a cured covercoat covering the conductor, an applied covercoat, based on total composition, including:
      c1) 15–30 wt. % of polyamide-imide;
      c2) a polytetrafluoroethylene present in an amount up to 20 wt. %;
      c3) a silica present in an amount up to 15 wt. %, wherein all of (a), (b) and (c) are dispersed in a 60–80 wt. % organic solvent; and
   d) the applied covercoat being cured at a temperature from 200 degrees Celsius to 300 degrees Celsius for 10 to 30 minutes.

* * * * *